United States Patent
Lee et al.

(10) Patent No.: US 9,836,983 B2
(45) Date of Patent: Dec. 5, 2017

(54) SYSTEM AND METHOD FOR RECORDING AND PLAYBACK OF INTERACTIONS ON A COMPUTING DEVICE

(71) Applicant: Amplify Education, Inc., Brooklyn, NY (US)

(72) Inventors: John J. Lee, Long Island City, NY (US); Zachary D. Wissner-Gross, Boston, MA (US); Kenny Peng, Long Island City, NY (US); Vivek Venkatachalam, Cambridge, MA (US)

(73) Assignee: Amplify Education, Inc., Brooklyn, NY (US)

(*) Notice: Subject to any disclaimer, the term of this patent is extended or adjusted under 35 U.S.C. 154(b) by 174 days.

(21) Appl. No.: 14/049,954

(22) Filed: Oct. 9, 2013

(65) Prior Publication Data
US 2014/0149496 A1 May 29, 2014

Related U.S. Application Data

(60) Provisional application No. 61/711,448, filed on Oct. 9, 2012.

(51) Int. Cl.
G09B 5/00 (2006.01)

(52) U.S. Cl.
CPC ...................... *G09B 5/00* (2013.01)

(58) Field of Classification Search
CPC ........... G06F 3/0481; G09B 5/02; G09B 5/00; H04L 65/403; H04L 12/1831
See application file for complete search history.

(56) References Cited

U.S. PATENT DOCUMENTS

| | | | | |
|---|---|---|---|---|
| 5,211,563 A | * | 5/1993 | Haga | G09B 5/14 434/322 |
| 5,930,473 A | * | 7/1999 | Teng | H04L 29/06 709/204 |
| 8,571,463 B2 | * | 10/2013 | Cohen | G09B 7/00 434/219 |
| 8,863,095 B2 | * | 10/2014 | Bharadwaj | G06F 11/3414 717/127 |
| 9,137,509 B2 | * | 9/2015 | Adcock | H04N 5/783 |
| 2002/0059376 A1 | * | 5/2002 | Schwartz | H04L 29/06027 709/204 |
| 2002/0108127 A1 | * | 8/2002 | Lew | G06F 17/30817 725/142 |
| 2004/0191744 A1 | * | 9/2004 | Guirguis | G09B 5/00 434/322 |

(Continued)

*Primary Examiner* — Uzma Alam
(74) *Attorney, Agent, or Firm* — Fish & Richardson P.C.

(57) ABSTRACT

A system and method for providing playback of interactions on a computing device. The system is configured to provide a user of a computing device with the capability of playing and/or recording walkthroughs on a user interface of the computing device, wherein the user is able to directly interact with the walkthrough and user interface in real- or near real-time during playback of the walkthrough. The walkthrough may be tutorial-based, such that the user may follow along with the walkthrough when attempting to answer a question or solve a problem via the user interface (e.g. classroom lesson on solving equations). The system is further configured to allow the user to record and generate a customized walkthrough.

17 Claims, 9 Drawing Sheets

(56) References Cited

U.S. PATENT DOCUMENTS

| | | | | |
|---|---|---|---|---|
| 2006/0172275 A1* | 8/2006 | Cohen | ............. | G09B 7/00 |
| | | | | 434/350 |
| 2007/0043608 A1* | 2/2007 | May | ............. | G06Q 10/0633 |
| | | | | 705/7.27 |
| 2007/0065787 A1* | 3/2007 | Raffel | ............. | A63F 9/00 |
| | | | | 434/177 |
| 2008/0075418 A1* | 3/2008 | Hook | ............. | G09B 5/065 |
| | | | | 386/326 |
| 2008/0160492 A1* | 7/2008 | Campbell | ............. | G09B 19/00 |
| | | | | 434/379 |
| 2008/0166692 A1* | 7/2008 | Smith | ............. | G09B 7/00 |
| | | | | 434/322 |
| 2008/0254419 A1* | 10/2008 | Cohen | ............. | G09B 7/00 |
| | | | | 434/219 |
| 2010/0081116 A1* | 4/2010 | Barasch | ............. | A63B 24/0003 |
| | | | | 434/252 |
| 2011/0008761 A1* | 1/2011 | Hakopian | ............. | G09B 5/065 |
| | | | | 434/308 |
| 2012/0171656 A1* | 7/2012 | Shen | ............. | G09B 5/14 |
| | | | | 434/365 |
| 2013/0028400 A1* | 1/2013 | Fix | ............. | H04L 51/36 |
| | | | | 379/88.13 |
| 2013/0031208 A1* | 1/2013 | Linton | ............. | H04L 67/125 |
| | | | | 709/217 |
| 2013/0129316 A1* | 5/2013 | Dontcheva | ............. | H04N 5/76 |
| | | | | 386/241 |
| 2013/0171594 A1* | 7/2013 | Gorman | ............. | G09B 5/00 |
| | | | | 434/219 |
| 2014/0127659 A1* | 5/2014 | Barasch | ............. | A63B 69/36 |
| | | | | 434/252 |

\* cited by examiner

SYSTEM AND METHOD FOR RECORDING AND PLAYBACK OF INTERACTIONS ON A COMPUTING DEVICE

CROSS-REFERENCE TO RELATED APPLICATIONS

The present application claims priority to, and the benefit of, U.S. Provisional Patent Application Ser. No. 61/711,448, filed Oct. 9, 2012 and titled SYSTEM FOR RECORDING AND PLAYING INTERACTIONS ON A COMPUTER, TABLET, OR MOBILE DEVICE, the entire disclosure of which is incorporated herein by reference.

FIELD

The present disclosure relates generally to human-machine interaction, and, more particularly, to a system and method for providing recording and playback of interactions, specifically walkthroughs, on a computing device.

BACKGROUND

There are currently a variety of instructional and tutorial-based methods for consumers. With ongoing advances in technology, many of these methods are now computer-based, such that many courses may now be provided in packaged software applications or taught via online resources (e.g. web browser applications). Some software applications, as well as web-based applications, provide a learn-by-doing approach, providing a user with interactive tutorial materials. For example, some current tutorial-based methods provide playback of a video showing an instructor at a chalkboard or a screencast of the instructor's computer such that students may follow the instructor's lead during the course of class or lesson (e.g. solving a mathematical problem). However, current tutorial-based methods have relatively limited flexibility and efficiency. For example, the presentation of information to the user is generally provided in a strict sequence which must be followed in the order set forth, thus lacking the ability to interact with the user dynamically and intuitively.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION

By way of overview, the present disclosure is generally directed to a system and method for providing recording and playback of interactions on a computing device. In particular, the system is configured to provide a user of a computing device with the capability of playing and/or recording walkthroughs on a user interface of the computing device, wherein the user is able to directly interact with the walkthrough and user interface in real- or near real-time during playback of the walkthrough. As used herein, the term "walkthrough" refers to an instance of recorded data. The recorded data includes, but is not limited to, audio data, image data, and one or more simulated actions, such as command input (e.g., mouse movements and clicks, keypad/keyboard commands, etc.). In some embodiments, a walkthrough may include audio data combined with a list of timestamped simulated actions.

The system is configured to allow playback of walkthroughs on a user interface of the computing device via a web browser, for example. In some embodiments, the walkthrough may be tutorial-based, such that the user may follow along with the walkthrough when attempting to answer a question or solve a problem via the user interface (e.g. classroom lesson on solving equations). The system is further configured to allow the user to interact with the walkthrough (e.g. pausing, rewinding, fast-forwarding, etc.), thereby providing a user with the ability to work through a lesson at desired intervals without the aid of the walkthrough. Furthermore, the system is configured to allow the user to directly interact with the user interface during playback of the walkthrough, such that the user may work through a problem at any desired time during playback of the walkthrough.

A system consistent with the present disclosure generally provides a more engaging, hands-on experience for a user who is receiving educational instruction on a computing device. The system is intended to simulate a tutor sitting next to the user and using their device to guide the student how to solve a problem, rather than simply displaying a video to the user. An advantage of a system consistent with the present disclosure is that the system does not rely on the playback of video, but rather a list of simulated actions, wherein the actions can be encoded much more efficiently and compactly on a computing device. Furthermore, during playback of the walkthrough, the recorded simulated actions are able to manipulate elements on the user interface (such as sliders or menus) that the user is currently viewing, as opposed to just showing a video. As such, a user is able to carry on with the problem (continue manipulating screen elements) during or after playback of the walkthrough. Furthermore, the system provides recording capabilities, such that users of the recording tool benefit from a fast and easy way to create high-quality instructional material.

Figure 1:
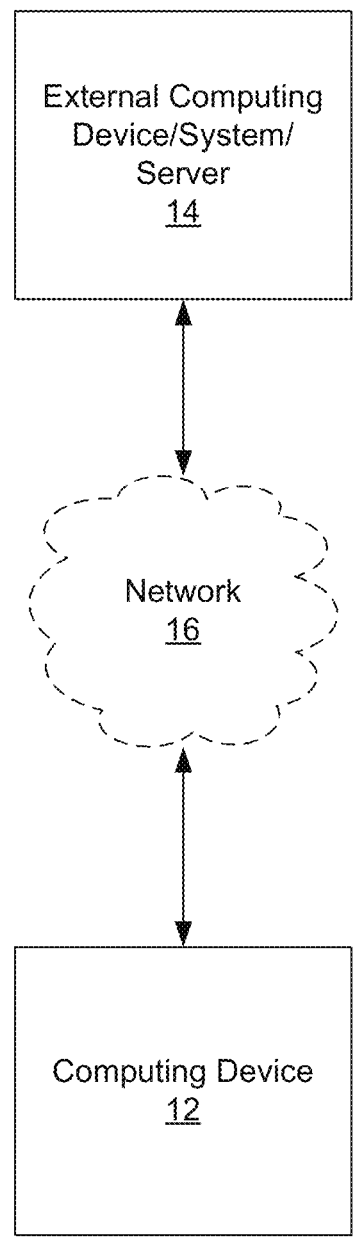
FIG. 1 is a block diagram illustrating one embodiment of a system for providing recording and playback of interactions on a computing device consistent with various embodiments of the present disclosure.

Turning to FIG. 1, one embodiment of a system for providing recording and playback of interactions on a computing device is generally illustrated. As shown, the system 10 includes a computing device 12 configured to be communicatively coupled to an external device, system or server 14 via a network 16. The computing device 12 may be embodied as any type of device for providing a user with computing functions and capabilities and further provide a user with an interface for interacting with one or more programs, such as, for example, tutorial programs, executed and run on the computing device 12 and/or via a web-based browser. The computing device 12 may include, but is not limited to, a personal computer (PC) (e.g. desktop or notebook computer), a television, video monitor, electronic billboard, tablet computer, smart phone (e.g., iPhones®, Android®-based phones, Blackberries®, Symbian®-based phones, Palm®-based phones, etc.), portable video game device, portable digital assistant (PDA), portable media player (PMP), e-book, and other computing device.

The external computing device/system/server 14 may be embodied as any type of device, system or server for communicating with the computing device 12 and for performing the other functions described herein. Examples embodiments of the external computing device/system/server 14 may be identical to those just described with respect to the computing device 12 and/or may be embodied as a conventional server, e.g., web server or the like.

The network 16 may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the computing device 12 and the external computing device/system/server 14, may be, in whole or in part, a wired connection.

The network 16 may be any network that carries data. Non-limiting examples of suitable networks that may be used as network 16 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), other networks capable of carrying data, and combinations thereof. In some embodiments, network 16 is chosen from the internet, at least one wireless network, at least one cellular telephone network, and combinations thereof. As such, the network 16 may include any number of additional devices, such as additional computers, routers, and switches, to facilitate communications. In some embodiments, the network 16 may be or include a single network, and in other embodiments the network 16 may be or include a collection of networks.

As described in greater detail herein, the computing device 12 is configured to allow a user to interact with program, such as, for example, a tutorial-based lesson provided via a web page or the like from the external computing device/system/server 14. During user interaction with the lesson program, the computing device 12 may be configured to allow playback of a walkthrough related to the current lesson that the user is viewing/working on. As used herein, the term "walkthrough" refers to an instance of recorded data. The recorded data includes, but is not limited to, audio data, image data, and one or more simulated actions, such as command input (e.g., mouse movements and clicks, keypad/keyboard commands, etc.). In some embodiments, a walkthrough may include audio data combined with a list of timestamped simulated actions. The user may use the walkthrough for guidance when answering/solving a question/problem posed in the lesson.

Figure 2:
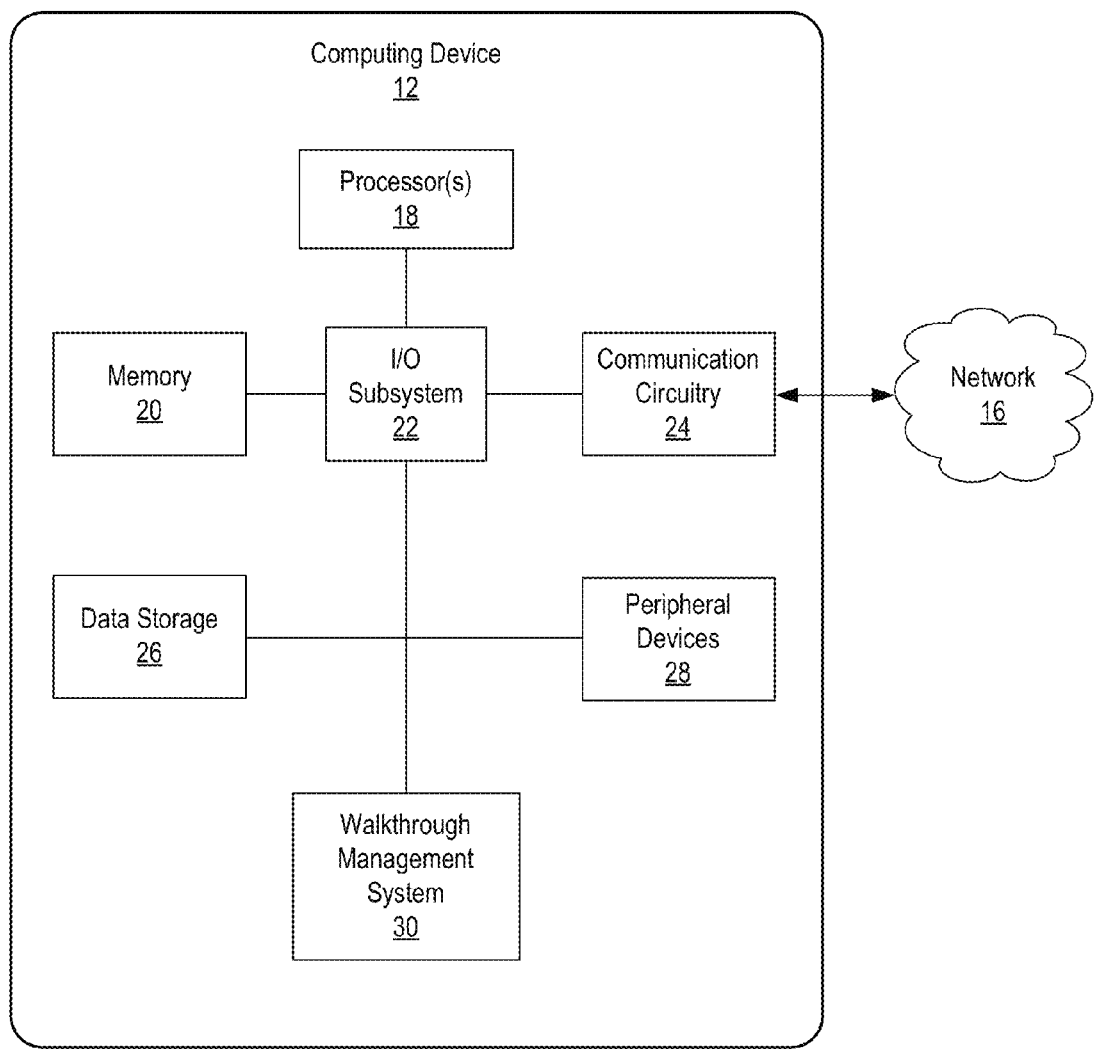
FIG. 2 is a block diagram illustrating at least one embodiment of a computing device of the system of FIG. 1 consistent with the present disclosure.

Turning to FIG. 2, at least one embodiment of a computing device 12 of the system of FIG. 1 is generally illustrated. In the illustrated embodiment, the computing device 12 includes a processor 18, a memory 20, an input/output subsystem 22, communication circuitry 24, a data storage 26, peripheral devices 28, and a walkthrough management system 30. As generally understood, the computing device 12 may include fewer, other, or additional components, such as those commonly found in conventional computer systems. Additionally, in some embodiments, one or more of the illustrative components may be incorporated in, or otherwise from a portion of, another component. For example, the memory 20, or portions thereof, may be incorporated into the processor 18 in some embodiments.

The processor 18 may be embodied as any type of processor capable of performing the functions described herein. For example, the processor may be embodied as a single or multi-core processor(s), digital signal processor, microcontroller, or other processor or processing/controlling circuit. Similarly, the memory 20 may be embodied as any type of volatile or non-volatile memory or data storage capable of performing the functions described herein. In operation, the memory 20 may store various data and software used during operation of the computing device 12 such as operating systems, applications, programs, libraries, and drivers. The memory 20 is communicatively coupled to the processor 18 via the I/O subsystem 22, which may be embodied as circuitry and/or components to facilitate input/output operations with the processor 18, the memory 20, and other components of the computing device 12.

For example, the I/O subsystem 22 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 22 may form a portion of a system-on-a-chip (SoC) and be incorporated, along with the processor 18, the memory 20, and other components of computing device 12, on a single integrated circuit chip.

The communication circuitry 24 of the computing device 12 may be embodied as any communication circuit, device, or collection thereof, capable of enabling communications between the computing device 12 and the external device, system, server 14 via the network 16. The communication circuitry 24 may be configured to use any one or more communication technology and associated protocols, as described above, to effect such communication.

The data storage 26 may be embodied as any type of device or devices configured for short-term or long-term storage of data such as, for example, memory devices and circuits, memory cards, hard disk drives, solid-state drives, or other data storage devices. In the illustrative embodiment, the computing device 12 may maintain one or more application programs, databases, media and/or other information in the data storage 26. As described in greater detail below, during recording of a walkthrough, at least one of audio data, image data, and user input based on command actions from the one or more peripheral devices 28 (e.g., mouse movements and clicks, keypad/keyboard commands, etc.) may be stored in the data storage 26 and utilized by the walkthrough management system 30 for playback on the device 12. The peripheral devices 28 may include one or more devices for interacting with the device 12 (shown in FIG. 3 and described in greater detail herein).

The computing device 12 further includes a walkthrough management system 30. As described in greater detail herein, the walkthrough management system 30 is configured to receive data from the external computing device/system/server 14, such as a web-based application providing a tutorial program and provide an interface for user interaction with the tutorial program. The walkthrough management system 30 is further configured to provide playback of one or more walkthroughs related to the tutorial program and further allow user interaction with at least the walkthrough and/or tutorial program during playback of the walkthrough. As generally understood, the walkthroughs may be retrieved from the external computing device/system/server 14, as well as the local data storage 26. The walkthrough management system 30 is further configured to allow recording of walkthroughs as initiated by the user, the recording of walkthroughs based on user input and interaction with the tutorial program.

Figure 3:
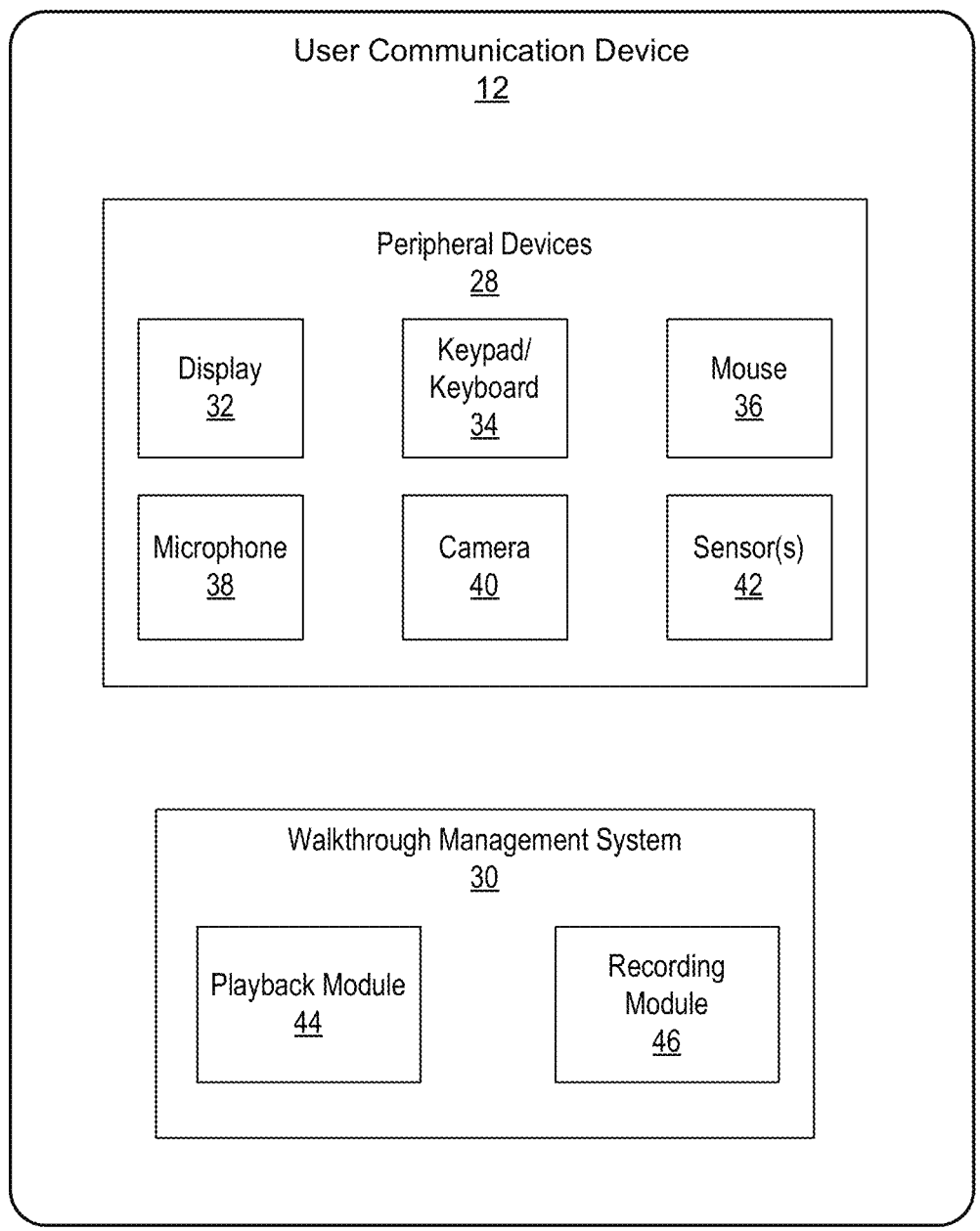
FIG. 3 is a block diagram illustrating a portion of the computing device of FIG. 2 in greater detail.

FIG. 3 is a block diagram illustrating a portion of the computing device 12 of FIG. 2 in greater detail. In the illustrated embodiment, the computing device 12 includes a variety of peripheral devices 28. For example, the device 12 may include at least a display 32. The display 32 may generally display graphics and text, as well as provides a user interface (e.g., but not limited to graphical user interface (GUI)) through which a user may interact with the device 12, such as accessing and interacting with web-based applications, as well as applications stored locally in the data storage 26. In one embodiment, the device 12 may include a touch-sensitive display (also known as "touch screens" or "touchscreens"). The device 12 may further include a keypad/keyboard 34, a mouse 36, a microphone 38, a camera 40, and additional sensors 42.

The walkthrough management system 30 may include a playback module 44 and a recording module 46. The playback module 44 may be configured to present a walkthrough to the user via the user interface on the display 32 during user interaction with a currently running tutorial program. As generally understood by one of ordinary skill in the art, the playback module 44 may use any known playback technique or methodology. As described in greater detail herein, the walkthrough management system 30 is configured to allow the user to interact with the walkthrough and/or underlying tutorial program, during playback of the walkthrough.

The recording module 46 may be configured to allow a user to create a walkthrough. In particular, a user may initiate a recording of one or more command actions from the one or more peripheral devices 28 (e.g., mouse movements and clicks, keypad/keyboard commands, etc.) either alone, or in combination with audio data and/or image data. For example, while working on solving a problem in the tutorial program, the user may wish to record the process in which they solved the problem (e.g. solving a mathematical equation). The user may then initiate a recording of their interaction with user interface while solving the problem. The recording module 46 is configured to subsequently capture data based on user input. The user input may be in the form of user commands from the one or more peripheral devices 28 (e.g., mouse movements and clicks, keypad/keyboard commands, etc.) as well as audio data (e.g., record voice input from the microphone 38) and/or image data (e.g., include a locally stored image). The recording module 46 is configured to generate a user-created walkthrough based on the captured data. The user-created walkthrough can be stored locally in the data storage 26, for example, for later playback by way of the playback module 44.

As generally understood, a single user action, with respect to interaction with the user interface, may correspond to a single command input (e.g., mouse/keyboard event), such as a mouse-down, mouse-up, key-down, key-up, or mouse-move. In the event that a walkthrough is being played back or recorded on a touchscreen display of the device 12, the command inputs may similarly be touch-start, touch-end, and touch-move actions.

Accordingly, a relatively simple sequence of actions might be represented as:
(MOUSE_DOWN, 100, 100, 0)
(MOUSE_MOVE, 500, 100, 1000)
(MOUSE_UP, 500, 100, 3000)

This example of actions represents a mouse button being clicked at the coordinates (100, 100) on a display, dragged to the coordinates (500, 100) after 1000 milliseconds, and then releasing the mouse button at that point 3000 milliseconds since the start of playback.

Figure 4:
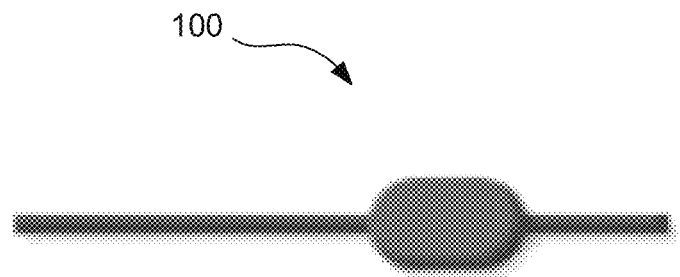
FIG. 4 is a graphic representation of a slider control element controllable based on a method consistent with the present disclosure.

FIG. 4 is a graphic representation of a slider control element controllable based on a method consistent with the present disclosure. An example of where such a sequence of actions described above might be applied is when demonstrating the use of the slider control element 100 of FIG. 4.

It should be noted that not all user actions are "low-level" (i.e., have a one-to-one correspondence with keyboard/mouse events). The device 12, specifically the walkthrough management system 30, is configured to support "pointer" actions. During a walkthrough, the "pointer" may be rendered as a small dot on the display, which may move around without manipulating any of the on-screen elements.

Consider the following list of actions:
(POINTER_DOWN, 100, 100, 0)
(POINTER_MOVE, 500, 100, 1000)
(POINTER_UP, 500, 100, 3000)

This sequence of actions would result in a dot appearing at (100,100), then moving to (500,100) 1000 milliseconds later, and then disappearing 3000 milliseconds into playback of the walkthrough. In the slider example above, this set of actions would not cause the slider 100 to be dragged, but would rather simply show a red dot hovering over the slider 100.

The device 12, specifically the walkthrough management system 30, is configured to support "arrow" actions, wherein, during playback of a walkthrough, an arrow is generated and rendered on the display at specified coordinates, and further disappears after a certain amount of time.

For example, consider the following action:
(ARROW, 100, 100, 200, 200, 1000, 2000)

This action is intended to show an arrow with the tail at (100,100) and the head at (200,200). The arrow will appear 1000 milliseconds after the start of playback, and disappear 2000 after the start of playback. The last parameter (the 2000 coordinate) is optional (e.g., if not specified, the arrow remains on the screen until the end of playback).

Figure 5A:
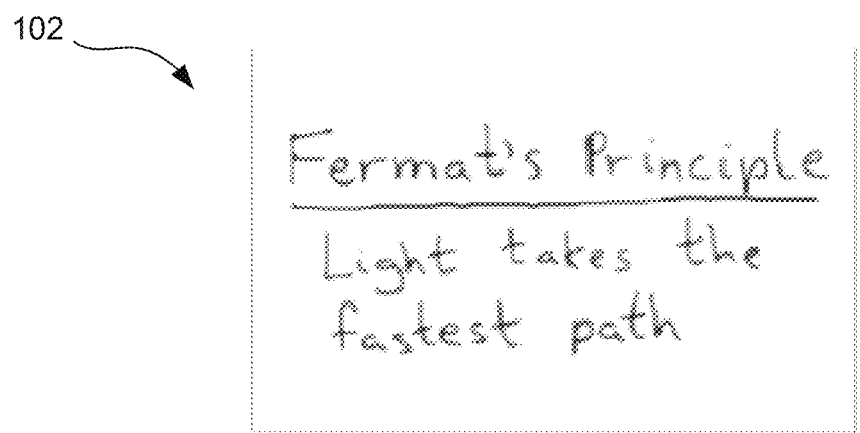
FIG. 5A is a graphic representation of an image to be used in a method consistent with the present disclosure.
Figure 5B:
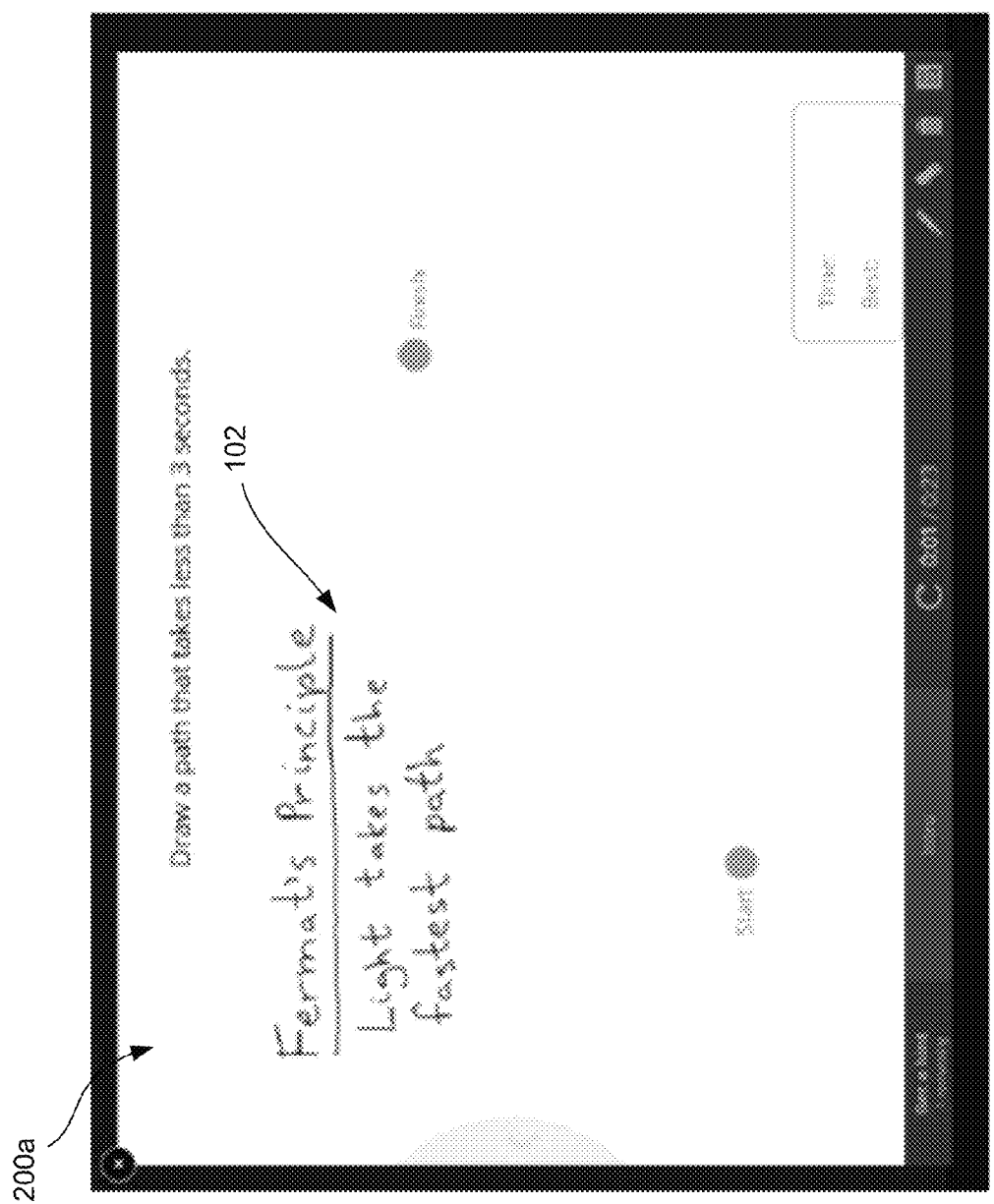
FIG. 5B is a screenshot of an exemplary interface and walkthrough including the image of FIG. 5A.

FIG. 5A is a graphic representation of an image to be used in a method consistent with the present disclosure and FIG. 5B is a screenshot of an exemplary interface and walkthrough including the image of FIG. 5A. As shown, the interface 200*a* of a tutorial program is presented to the user on the computing device 12. In the illustrated embodiment, the user may be presented with a problem depicted on the interface 200*a* (e.g. "Draw a path that takes less than 3 second"), in which, in order to solve the problem, the user must necessarily interact with the interface (e.g. connect the "Start" point with the "Finish" point). In order to obtain a "hint" or help with this problem, the user may initiate a walkthrough that may assist the user in solving the problem. As shown, the walkthrough may include an image 102 that is displayed to the user during user interaction with the tutorial program interface 200*a*.

Figure 6:
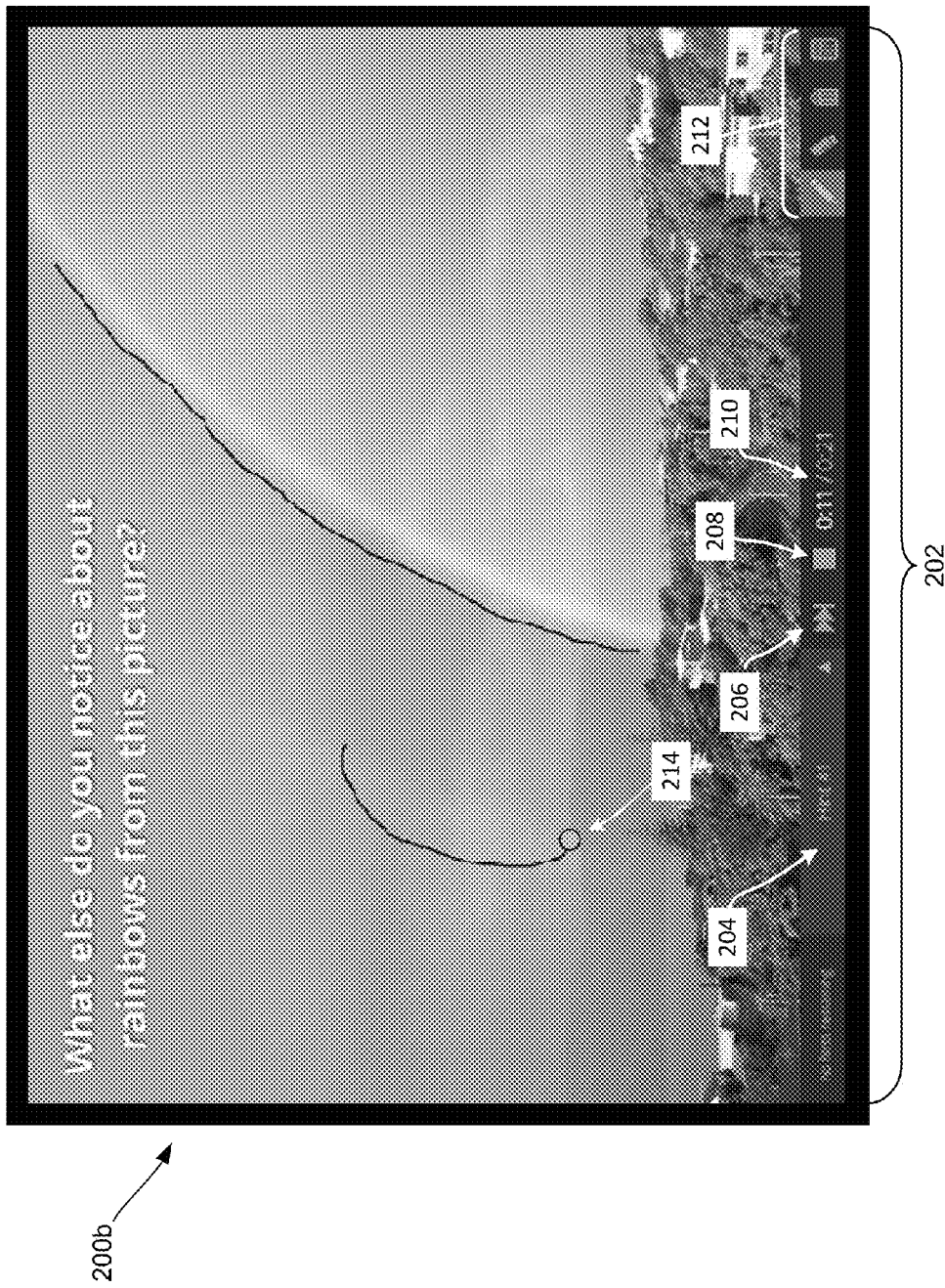
FIG. 6 is a screenshot of another exemplary interface illustrating an exemplary method of providing playback of a walkthrough consistent with the present disclosure.

FIG. 6 is a screenshot of another exemplary interface illustrating an exemplary method of providing playback of a walkthrough consistent with the present disclosure. In the illustrated embodiment, a walkthrough is shown during playback of said walkthrough. The interface 200*b* generally includes a toolbar 202 providing a user with a variety of options for interacting with the walkthrough presentation as well as interacting with the underlying question/problem posed in the tutorial program. In particular, the toolbar 202 may provide a user with a hint/help input 204. Upon selecting the hint/help input 204, the walkthrough management system 30 may then initiate playback of a walkthrough. The toolbar 202 further includes inputs for controlling presentation of the walkthrough (e.g. fast-forward 206, stop 208) as well as a status indicator 210 providing an indication to the user of the amount of elapsed time in relation to total time of the walkthrough playback.

The toolbar 202 further includes a digital scratchpad 212 for user interaction with the underlying question/problem of the running tutorial program. The scratchpad 212 may allow the user to draw on the user interface 200*b* by clicking on the pencil icon and then dragging their mouse (or finger, on a touchscreen device) across the screen. In this example, the list of recorded actions involves a click on the pencil icon, and then several click/drag motions on the screen, thereby simulating a user drawing on screen.

The current mouse position of the walkthrough is depicted by arrow 214. In this example, the walkthrough has played back a MOUSE_DOWN event in the past, and is currently in the middle of a series of MOUSE_MOVE events. The dot designated by arrow 214 indicates the position of the last MOUSE_MOVE event, and appears to the user to be moving around.

The following describes the steps of initiating playback of a walkthrough. Prior to any playback of a walkthrough, the walkthrough management system 30 is configured to determine whether the audio data included in the walkthrough (if any audio data is included) is either completely downloaded, or the download of the audio is progressing sufficiently so as to allow streaming of the playback. It should be noted that this type of streaming buffering may be accomplished by a web browser of the computing device 12. Playback of the walkthrough generally does not occur until all or a sufficient amount of audio accompanying the walkthrough has loaded, thereby ensuring uninterrupted start to finish real- or near real-time playback.

Upon establishing sufficient audio download, the state of the screen elements are set up to be predictable so as to ensure that playback of a walkthrough appears consistently the same for each playback. The scratchpad 212 is cleared (if the user has drawn anything with it), the scratchpad pencil and/or eraser tools are deactivated (if one of them is selected), and an image of the walkthrough is provided on the interface (in the event that an image is included with the walkthrough).

During the course of walkthrough playback, user input may be blocked. In particular, all user input may ignored during playback, including any clicks and movement of the mouse and keypress events on the keypad/keyboard. Thus, a user moving their mouse or clicking on the screen has no effect on the playback of the walkthrough. By blocking user input, a playedback walkthrough always appears the same. In some embodiments, not all of the user input is blocked during walkthrough playback. For example, the user may still be able to control presentation of the playback via the fast-forward and stop inputs.

Upon playback of the walkthrough, any audio data included in the walkthrough begins playback simultaneously with the actions associated with the walkthrough. To execute the actions, a list of actions associated with the walkthrough are iterated, wherein the list is ordered based on timestamp. During playback, the actual elapsed time is monitored and when the elapsed time matches the timestamp of the action occurring next on the list, the walkthrough playback system 30 is configured to execute that action and then search for the subsequent action from the list.

For relatively "simple" actions (mouse down/up, mouse moves, keypresses), the action is simulated on the browser itself. In some embodiments, additional data related to the action may be rendered for specific actions. For example, for every mouse-down event, a large, semitransparent dot may be rendered, wherein the dot may slowly dissipate from view on the display. The semitransparent dot may be helpful in indicating to the user where the click event occurred. In one embodiment, a dot (e.g., reference 214 in FIG. 6) is rendered for every mouse-move event. The dot does not need to be as large, because the dot appears to be moving smoothly and the user can track it with their eye over time. This is unlike mouse-down events, where the user may not know where to look initially. The screenshot of FIG. 7 illustrates both of the visual cues (large semitransparent dot and single dot) described above.

Figure 7:
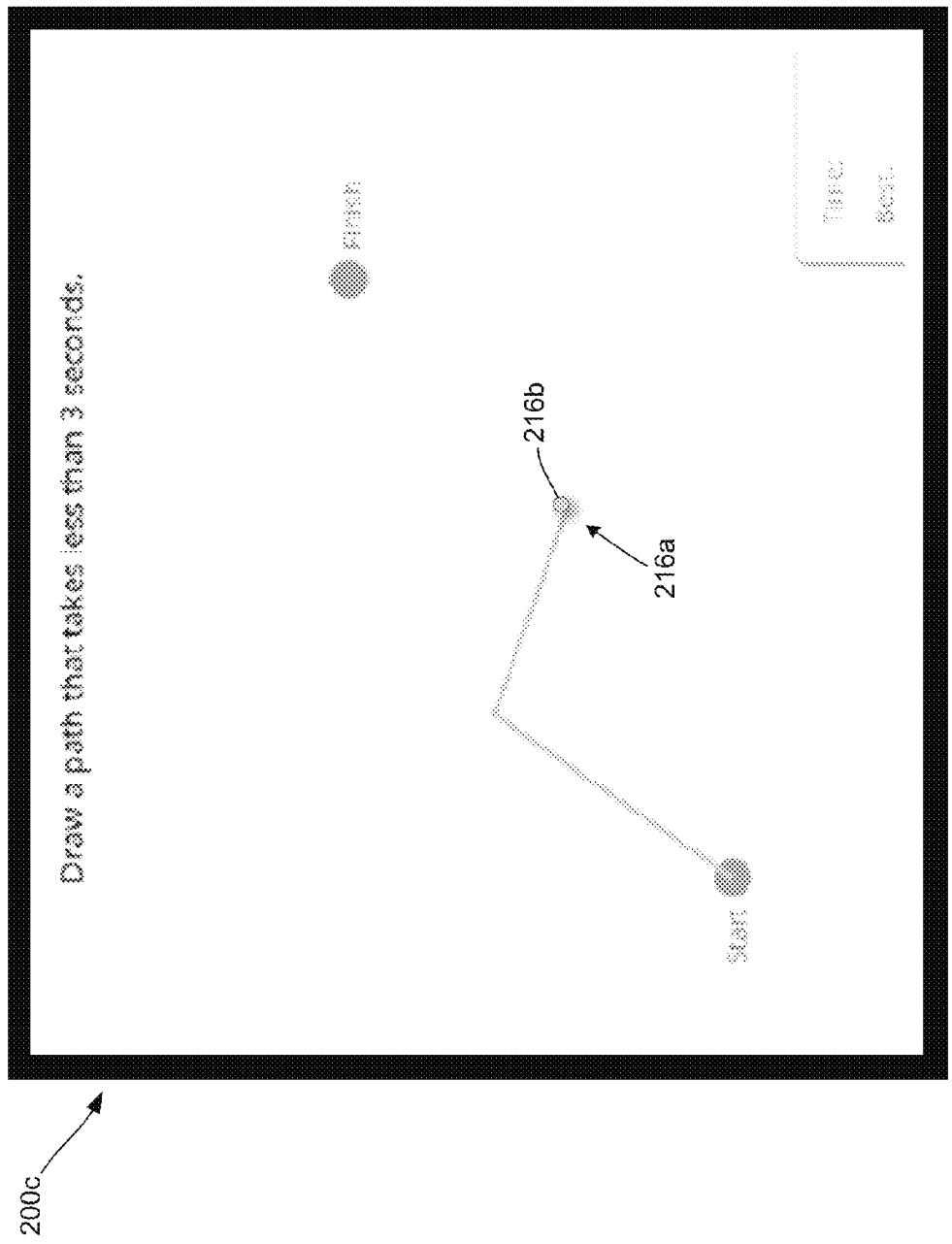
FIG. 7 is a screenshot of another exemplary interface illustrating another exemplary method of providing playback of a walkthrough in combination with user interaction consistent with the present disclosure.

As shown in FIG. 7, a large semitransparent circle 216*a* is rendered at or near the center of the screen, wherein the circle 216*a* slowly fades away. In addition, there is a smaller, but darker-colored dot 216*b* close in proximity to the circle 216*a* The large faded circle 216*a* indicates the position of where the MOUSE_DOWN action happened, and the darker dot 216*b* indicates that the pointer has moved slightly (up and to the right) since the initial MOUSE_DOWN event. The large faded circle 216*a* continues to disappear over time, but the smaller, darker dot 216*b* only disappears on the next MOUSE_UP event.

In the event that a MOUSE_DOWN action is played while the scratchpad is active, the large faded circle 216*a* is not shown. This is based, in part, on the fact that the typical use of the scratchpad involves writing words on the screen, which usually consists of many short strokes, which in turn means many MOUSE_DOWN events happening in close proximity within a short period of time, which may be distracting to users. When playing back other actions (e.g., POINTER_DOWN, POINTER_MOVE, POINTER_UP, ARROW), the large faded circle 216*a* is rendered on the screen, but we do not need to dispatch any simulated mouse/keyboard events to the web browser.

Slower computers and mobile devices sometimes are not able to keep up with playback. For example, a walkthrough might cause the scratchpad to write on the screen, but the CPU of the device playing the walkthrough may load in such a way that the current elapsed time is far greater than the timestamp of the next action on the list. If it takes longer to execute actions than what is specified by the sequence of timestamps in the walkthroughs, playback may begin to fall behind and fall out of sync with the audio.

To mitigate this, a method consistent with the present disclosure includes selectively skipping actions whenever the current elapsed time is greater than the timestamp of the next action on the list When in this mode, any MOUSE_MOVE or POINTER_MOVE action is ignored, while continuing to play all other actions in their usual way. In doing so, the walkthrough player may be able to "catch up" so that the actual elapsed time is less than or equal to the next action's timestamp.

In the event that the user selects the stop selection input 208 of the presentation toolbar 202, the audio playback is stopped and the actions cease from executing. The method further includes determining whether MOUSE_DOWN action has been executed but not a corresponding MOUSE_UP action (or a POINTER_DOWN without a corresponding POINTER_UP action). In these instances cases, the method includes dispatching an extra MOUSE_UP or POINTER_UP action before stopping playback, so as to prevent the browser from being left in an inconsistent state when playback is stopped. Further, upon selecting the stop input 208, the user input blocking is deactivated.

Figure 8:
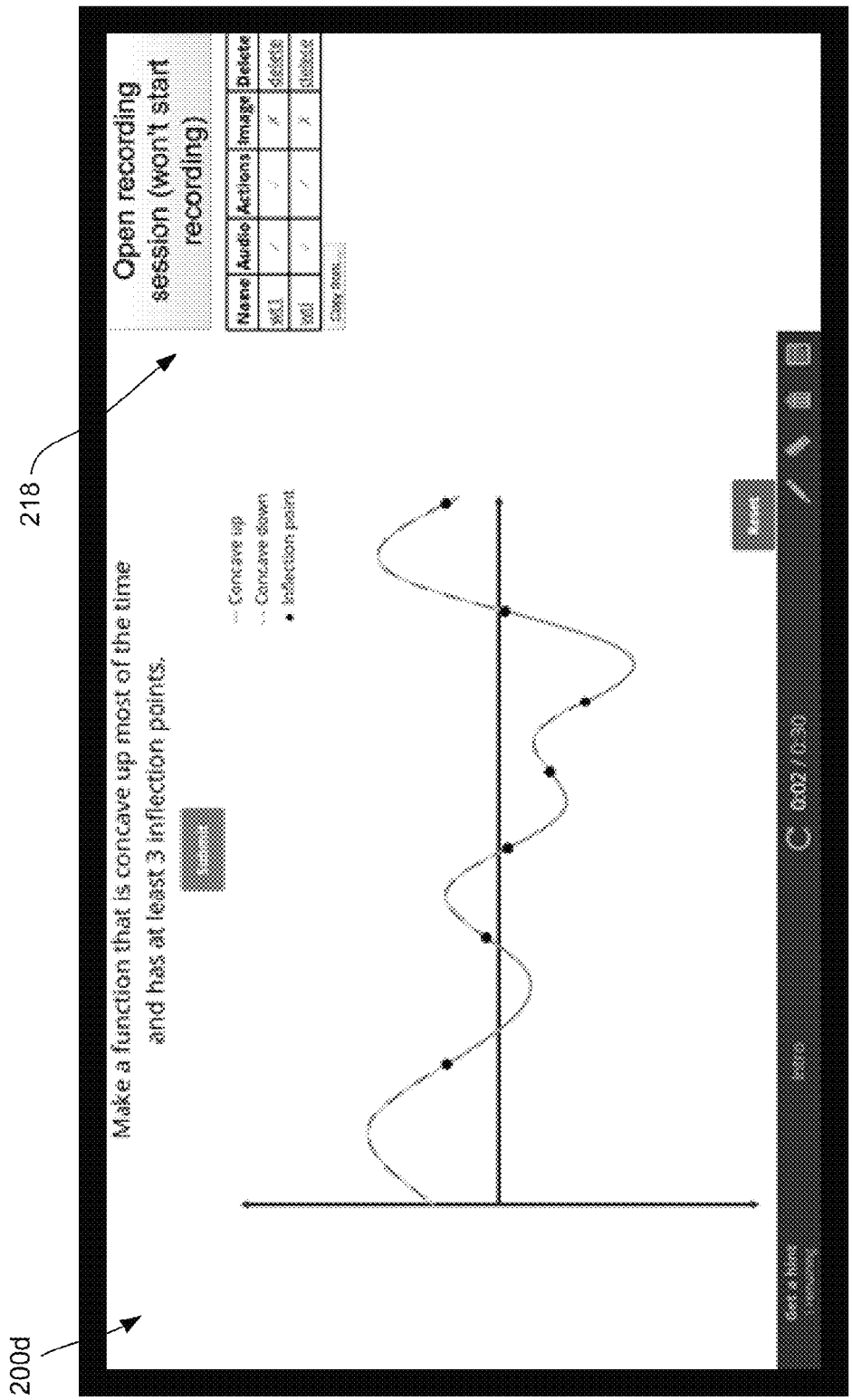
FIG. 8 is a screenshot of an exemplary interface illustrating an exemplary method of recording a walkthrough consistent with the present disclosure.
Figure 9:
FIG. 9 illustrates the recording tool of the interface of FIG. 8 in greater detail.

FIG. 8 is a screenshot of an exemplary interface illustrating an exemplary method of recording a walkthrough consistent with the present disclosure. FIG. 9 illustrates the recording tool of the interface of FIG. 8 in greater detail. As previously described, the walkthrough management system 30 is further configured to allow recording of walkthroughs as initiated by the user, the recording of walkthroughs based on user input and interaction with the tutorial program. As shown, the interface 200d provides instance of the page for which a walkthrough will be recorded and a recording tool 218 allowing a user to customize the walkthrough to be generated. As shown, the recording tool 218 includes a table that lists all recorded walkthroughs for this page, and indicates whether audio, actions, and an image is present. It also allows users to delete recorded walkthroughs.

In order to initiate recording of a walkthrough, a user may interact with the recording tool 218, selecting a start button. Upon selecting the start button, a user may be prompted to enter a name for the walkthrough they are about to record, or the name of an existing walkthrough to overwrite. The user may first specify an image to include in the walkthrough. At this point, the user may use the scratchpad to draw an image. For new walkthroughs, if anything is drawn onto the scratchpad, it will get saved to the local data storage 26 and/or the external computing device, system/server 14. In the event that the user is working on an existing walkthrough, the image currently associated with the current walkthrough is first pasted onto the scratchpad. The user may then modify the image, leave it alone, or delete it.

The user may then decide whether to record audio data, user actions, or combinations of both. The checkboxes in the screenshot of the recording tool 218 of FIG. 9 allow users to record one component at a time, or both. When the user has made their selection, they can begin recording. In order to record audio, the microphone is activated and configured to capture audio data (e.g., voice input). In order to record user actions, the mouse and keypad/keyboard events are captured. If the user is modifying an existing walkthrough and chooses to record only audio, then audio will be recorded while the previously-recorded actions are being played back. Similarly, if the user is modifying an existing walkthrough and chooses to record only actions, then actions will be recorded while the previously-recorded audio is being played back.

It should be noted that, while recording keypress/mouse events, such events are translated into actions before storing such events. For "simple" actions, there is a one-to-one correspondence between mouse/key events and recorded actions. For example, the method includes detecting that the user has pressed the left mouse button, recording a MOUSE_DOWN event at the given timestamp and coordinates. Similarly, when the user moves the mouse or release the left mouse button, the method includes recording MOUSE_MOVE and MOUSE_UP events, respectively. The same methods are used with key-down and key-up events.

Recording POINTER or ARROW events may require slightly more processing. In one embodiment of a method, there are two ways for a user to record POINTER actions: (1) detecting right-mouse-button clicks and interpreting those as POINTER_DOWN, POINTER_MOVE, and POINTER_UP actions, or (2) detecting when the "Shift" button is being held down while the left-mouse-button is being used, and interpret those as POINTER actions rather than MOUSE actions.

An ARROW event is similarly recorded by looking at the state of the keyboard at the time of a mouse click. Similar to using the Shift key to indicate POINTER events (instead of MOUSE events), the method may rely on the Ctrl key to indicate that that the next set of mouse clicks as ARROW actions rather than MOUSE actions.

Upon recording the selected audio and/or user actions, a user-created walkthrough is generated. The user-created walkthrough can be stored locally in the data storage 26 or the external computing device/system/server 14 and may be accessed for later playback.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

Equivalents

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system that is configured to provide recording and playback of interactions, the system comprising:
   a computing device that is configured to communicate with an external computing device and execute an application comprising a tutorial-based lesson program, the computing device comprising:
      a display that is configured to provide an interface (i) that is associated with the tutorial-based lesson program and (ii) that is configured to receive input and provide feedback to a user interacting with the tutorial-based lesson program; and
      a walkthrough management system comprising:
         a playback module that is configured to provide, in the interface that is associated with the tutorial-based lesson program, a walkthrough for the tutorial-based lesson program, wherein the walkthrough (i) performs, in the interface that is associated with the tutorial-based lesson program, actions for the user by manipulating elements that are on the interface and that are viewable to the user and (ii) is controlled by the user through selectable controls included in the interface that is associated with the tutorial-based lesson program, wherein the interface that is associated with the tutorial-based lesson program is configured to receive user input through the elements that are on the interface and from the user interacting with the tutorial-based lesson program at a stage of the tutorial-based lesson program that is after the actions performed by the walkthrough; and
         a recording module that is configured to record user input during playback of the walkthrough, wherein the playback module is further configured to provide, for output on the display, additional actions associated with the recorded user input during playback of a subsequent walkthrough, wherein the display is further configured to receive additional input through the display that is displaying the additional actions associated with the recorded user input during playback of the subsequent walkthrough.

2. The system of claim 1, wherein the computing device further comprises an audio source that is configured to output audio data associated with the walkthrough.

3. The system of claim 2, wherein:
   the audio data includes audio portions that correspond to each action performed by the walkthrough, and
   the playback module is configured to output a respective audio portion and perform a respective action that corresponds to the respective audio portion simultaneously.

4. The system of claim 1, wherein the user input being selected from the group consisting of a touch event, a mouse event, and a keypad or keyboard event.

5. The system of claim 4, wherein the computing device further comprises a microphone that is configured to capture voice input.

6. The system of claim 1, wherein the display is a touch-screen display.

7. The system of claim 1, wherein the walkthrough and the subsequent walkthrough are a same walkthrough.

8. The system of claim 1, wherein the walkthrough and the subsequent walkthrough are different walkthroughs.

9. A computer-implemented method, comprising:
   executing, by one or more computers, an application that includes a tutorial-based lesson program that displays an interface to a user;
   receiving, through the interface, a request for the tutorial-based lesson program to perform a walkthrough;
   in response to receiving the request to perform the walkthrough, performing, in the interface of the tutorial-based lesson program and by the walkthrough, actions for the user (i) by manipulating elements that are on the interface and that are viewable to the user and (ii) by updating the interface to simulate user selection of the manipulated elements;
   while performing the actions for the user (i) by manipulating the elements that are on the interface and that are viewable to the user and (ii) by updating the interface to simulate user selection of the manipulated elements, recording user input received through the interface;
   performing, by a subsequent walkthrough, additional actions associated with the recorded user input; and receiving, during playback of the subsequent walkthrough, additional user input through the elements that are on the user interface that is updated by the performed actions and the performed additional actions.

10. The method of claim 9, wherein performing the actions for the user (i) by manipulating the elements that are on the interface and that are viewable to the user and (ii) by updating the interface to simulate user selection of the manipulated elements comprises:
   outputting audio data associated with the subsequent walkthrough, wherein the audio data includes audio portions that correspond to each action performed.

11. The method of claim 10, wherein outputting the audio data associated with the subsequent walkthrough comprises:
   for each audio portion, outputting the audio portion and performing a respective action that corresponds to the audio portion, simultaneously.

12. The method of claim 9, wherein the user input and the additional user input are each a touch event, a mouse event, or a keypad or keyboard event.

13. The method of claim 9, wherein the user input or the additional user input comprises voice input.

14. The method of claim 9, wherein the interface is touch-screen interface.

15. A non-transitory computer-readable medium storing software comprising instructions executable by one or more computers which, upon such execution, cause the one or more computers to perform operations comprising:
   executing, by one or more computers, an application that includes a tutorial-based lesson program that displays an interface to a user;
   receiving, through the interface, a request for the tutorial-based lesson program to perform a walkthrough;
   in response to receiving the request to perform the walkthrough, performing, in the interface of the tutorial-based lesson program and by the walkthrough, actions for the user (i) by manipulating elements that are on the interface and that are viewable to the user and (ii) by updating the interface to simulate user selection of the manipulated elements;
   while performing the actions for the user (i) by manipulating the elements that are on the interface and that are viewable to the user and (ii) by updating the interface to simulate user selection of the manipulated elements, recording user input received through the interface;
   performing, by a subsequent walkthrough, additional actions associated with the recorded user input; and
   receiving, during playback of the subsequent walkthrough, additional user input through the elements that are on the user interface that is updated by the performed actions and the performed additional actions.

16. The medium of claim 15, wherein performing the actions for the user (i) by manipulating the elements that are on the interface and that are viewable to the user and (ii) by updating the interface to simulate user selection of the manipulated elements comprises:
   outputting audio data associated with the subsequent walkthrough, wherein the audio data includes audio portions that correspond to each action performed.

17. The medium of claim 15, wherein the user input and the additional user input are each a touch event, a mouse event, or a keypad or keyboard event.

* * * * *